(12) United States Patent
Shirochi

(10) Patent No.: US 6,310,724 B1
(45) Date of Patent: Oct. 30, 2001

(54) IMAGE DISPLAY APPARATUS

(75) Inventor: Yoshiki Shirochi, Chiba (JP)

(73) Assignee: Sony Corporation, Tokyo (JP)

( * ) Notice: Subject to any disclaimer, the term of this patent is extended or adjusted under 35 U.S.C. 154(b) by 904 days.

(21) Appl. No.: 08/877,781

(22) Filed: Jun. 17, 1997

Related U.S. Application Data (63) Continuation of application No. 08/497,113, filed on Jun. 30, 1995, now abandoned.

(30) Foreign Application Priority Data

Jul. 8, 1994 (JP) ........................................... 6-180842

(51) Int. Cl.$^7$ ............................... G02B 5/04; G02B 5/18; G02B 5/02; G02B 27/44
(52) U.S. Cl. ........................... 359/569; 359/559; 359/837
(58) Field of Search ..................... 359/569, 567, 359/566, 559, 837

(56) References Cited

U.S. PATENT DOCUMENTS

| | | |
|---|---|---|
| 1,758,977 | 5/1930 | Rolph . |
| 3,163,367 | 12/1964 | Bodian . |
| 3,877,802 * | 4/1975 | Greenspan ............................ 359/855 |
| 3,910,683 | 10/1975 | Nishino et al. . |
| 4,184,746 * | 1/1980 | Coale .................................. 359/569 |
| 4,310,219 | 1/1982 | Jaccard . |
| 4,443,088 * | 4/1984 | Ohtaka ................................ 359/569 |
| 4,472,735 | 9/1984 | Shinozaki et al. . |
| 4,634,219 * | 1/1987 | Suzuki ................................ 359/571 |
| 4,804,253 | 2/1989 | Stewart . |
| 4,878,737 | 11/1989 | Ise . |
| 4,989,959 | 2/1991 | Plummer . |
| 5,005,968 | 4/1991 | Tejima et al. . |
| 5,046,827 * | 9/1991 | Frost et al. ........................... 359/559 |
| 5,121,213 | 6/1992 | Nishioka . |
| 5,237,452 | 8/1993 | Okayama et al. . |
| 5,247,390 | 9/1993 | Hed . |
| 5,322,998 | 6/1994 | Jackson . |
| 5,471,344 * | 11/1995 | Sugawara et al. .................... 359/569 |
| 5,513,025 * | 4/1996 | Watanabe et al. .................... 359/569 |

FOREIGN PATENT DOCUMENTS

| | | |
|---|---|---|
| 0567995A1 | 11/1993 | (EP) . |
| 59-214825 | 12/1984 | (JP) . |

OTHER PUBLICATIONS

Japanese Patent Application No. HEI 05–16955, submitted Jan. 7, 1993 (no translation provided).
Japanese Patent Application No. HEI 05–196973, submitted Jul. 14, 1993 (no translation provided).
Patent Abstracts of Japan, vol. 18, No. 48 (P–1682) and JP 05 273540 (Seiko).
Patent Abstracts of Japan, vol. 18, No. 423 (P–1783) and JP 06 130356 A (Sony).
M. Keating, Geomteric, Physical, and Visual Optics. Butterworths, pp. 488–489 (May 1990).

* cited by examiner

*Primary Examiner*—Jon Henry
(74) *Attorney, Agent, or Firm*—Ronald P. Kananen; Rader, Fishman & Grauer (57) ABSTRACT

To effectively make a mesh of out lines between pixels by a pixel diffusion and at the same time to facilitate a focusing of an image by the observer, an optical filter for diffusing each pixel of a display device into a plurality of parts by utilizing diffraction or refraction is interposed between the display device having an image pattern in a mosaic form and an observer. The optical filter surface performs the pixel diffusion so that a sight angle, of a gap which does not pass light between the neighboring pixel after the pixel diffusion, as viewed from the observer on the focal plane on which the image displayed by the display device is observed by the predetermined observer is substantially a recognizable limit view angle of the observer.

17 Claims, 11 Drawing Sheets

IMAGE DISPLAY APPARATUS

This application is a continuation of application Ser. No. 08/497,1113 filed Jun. 30, 1995 now abandoned.

BACKGROUND OF THE INVENTION

1. Field of the Invention

The present invention relates to an image display apparatus using a display device such as an LCD (liquid crystal display) in which pixels are arranged in a mosaic pattern.

2. Description of the Related Art

In an image display apparatus, such as an LCD, using a display device in which a plurality of pixels are arranged in a mosaic pattern, in order to enhance a resolution, it is necessary to increase the number of pixels. It is impossible to unduly increase the number of the pixels or to unduly decrease a gap between the pixels due to the productive yield.

For this reason, in order to form a large-scale image field in such an image display apparatus, a mesh caused by pixel dots or gaps between the pixels (for example, at portions of LCD black stripes) is noticeable for the observer and difficult to watch. Also, in such a color image display apparatus, a color filter for three principle colors or three kinds of colors corresponding to the three principle colors is disposed on a front face of the above-described pixels at a predetermined repeated cycle. However, if the image field is enlarged, the pixel dot cycle at which the same color filter is disposed is noticeable and difficult to watch.

In CCD cameras, an electric treatment with a low pass filter makes it possible to cause the gap between the pixels to be unnoticeable. However, in an image display apparatus such as an LCD display apparatus, since it is necessary to fill the gap between the pixels after the formation of light, it is difficult to-make the pixel dots or mesh unnoticeable through the electric treatment. A method for fogging a lens focal point on the observer side has been proposed as a convenient method but a signal is also vague together. This is not preferable.

Therefore, some technology (for example, Japanese Patent Application Laid-Open No. Sho 59-214825, and Japanese Patent Application No. Hei 4-306003) has been proposed in which a diffuser (optical filter) having an optical filter face which is composed of a diffraction lattice or a micro prism group is provided on a front face of a display device such as an LCD, light from a single pixel is diffused into a plurality of rays of light, an image of the single pixel is formed on focus as an image (virtual image) of a plurality of pixels on a retina of the observer to thereby perform the diffusion of the pixel, and a focal position of the diffused image is located at the mesh position between the pixels to thereby make unnoticeable the mesh between the pixels.

FIGS. 13A to 13F show an example of a relationship among the pixel diffusion number, the resolution and the mesh reduction level. For the sake of simple explanation, the pixel diffusion in a lateral direction (X axis direction) of the display image will be explained with reference to this example but it should be noted that, in case of this example, the pixel diffusion is effected in a direction perpendicular to that direction, i.e., in a longitudinal direction in the same manner. Incidentally, in FIG. 13, the ordinate axis designates the luminance brightness, and the abscissa axis designates the spatial arrangement distance. Examples of FIGS. 13A to 13F are the cases where the diffused images of the respective pixels have the same luminance brightness.

FIG. 13A represents a pixel array along the X axis direction. In case of a black and white display device, ones shown by the solid lines are the neighboring pixels and a pixel cycle in the X axis direction is indicated by PCx. Also, in case of a color display device, for example, if the pixels shown by the solid lines are pixels in green, blue pixels and red pixels are present between the green pixels as indicated by dotted lines. Then, in this case, PCx is the same color pixel cycle and each cycle of the green, blue and red pixels is represented by PCx/3.

FIGS. 13B to 13F show the cases where the diffraction lattice or the micro prism is used and the respective pixels are uniformly diffused between the neighboring pixels under the condition that the diffused images of the respective pixels have the same luminance brightness.

FIG. 13B shows a case where a two-pixel diffusion for a shift by ±PCx/4 is effected to the original pixel position. The amount of shift (This is an interval between the pixels after the diffusion. This will be applied in the following description) is PCx/2.

FIG. 13C shows a case where a three-pixel diffusion for a shift by ±PCx/3 and zero is effected to the original pixel position. The shift amount is PCx/3.

FIG. 13D shows a case where a four-pixel diffusion for a shift by ±PCx/8 and ±3PCx/8 is effected to the original pixel position. The shift amount is PCx/4.

FIG. 13E shows a case where a six-pixel diffusion for a shift by ±PCx/12, ±3PCx/12 and ±5PCx/12 is effected to the original pixel position. The shift amount is PCx/6.

FIG. 13F shows a case where a nine-pixel diffusion for a shift by zero, ±PCx/9, ±2PCx/9 and ±3PCx/9 is effected to the original pixel position. The shift amount is PCx/9.

From the above-described cases, it is understood that, in the case where the respective pixels are diffused uniformly between the neighboring pixels, the relationship between the image diffusion number n and the shift amount S is given as follows:

$$S = PCx/n$$

Also, assuming that, in this case, M is the gap (hereinafter referred to as a pixel mask interval) through which light of the neighboring pixels (light of color corresponding to the pixel in case of the color) is not caused to pass, the following equation is given:

$$M = S - A$$

where A is the aperture width in the shift direction of the pixel.

In case of the six-pixel diffusion of the case shown in FIG. 13E, it will be understood that the outline between the pixels is almost filled, and M=0 is established so that the mesh is not noticeable. Also, in case of the nine-pixel diffusion of the cases shown in FIG. 13F, it will be understood that, as shown, a change of luminance brightness (non-uniformity in luminance brightness) appears due to the overlapped portion of the diffused image.

If a distance from a center of a single pixel to an edge of the diffused pixel in the subject pixel (i.e., edge of the display image of the subject pixel) is defined as an "edge spread" amount (E1 to E9), it will be understood that, as shown, the smaller the pixel diffusion number, the smaller the edge spread amount will become to thereby make it possible to indicate the clearer image. However, if the pixel diffusion number is small, in the case where a human eyes' low pass filter effect is not expected due to the large size of the display image, parts that are not luminous between the neighboring pixels are recognized as a mesh in a two-dimensional display, which degrades the image observation quality.

Subsequently, in FIG. 13G, the three-pixel diffusion is carried out by shifts of ±PCx/2 and zero by the optical filter surface 30a made of, for example, micro prisms. When the luminous level of the image having the shift amount of zero is represented by 1, the luminance brightness of the shift amount of ±PCx/2 is represented by ½. The diffusion image of the shift amount ±PCx/2 has the luminance brightness of 1 by the overlapping of the neighboring pixels. In this example, in spite of the small pixel diffusion number in comparison with the luminance brightness olf 1:1, the spread amount is large.

From the review of FIGS. 13A to 13G, it is understood that the conditions of the optimum pixel diffusion are preferably:

to effect the diffusion to the position that bisects the same color pixel pitch; and to increase the number of the diffusion more.

In order to suppress the edge spread, it is, preferable to decrease the number of diffusion and to make the diffusion luminous ratio equal.

In the example shown in FIGS. 13A to 13G as described above, if the image magnification is large and the small amount of mesh would make the observation difficult, it is most preferable to use the six-pixel diffusion shown in FIG. 13E.

Incidentally, under the above-described condition, the optimum value for the pixel diffusion number changes in accordance with the image magnification. Namely, in case of the small magnification, since the mesh is not noticeable, in some cases, it is generally preferable not to increase the diffusion number to the maximum level and the edge spread is small.

As described above, the mesh due to the gap between the pixels in the display device in which the pixels are arranged in a mosaic pattern may be made noticeable and at the same time the same color pixel dot cycle may be made noticeable.

By the way, in the case where the observer watches the image on the display device, it is general that the observation is made to adjust the lens so that the display image is focused on the imaging face.

However, in the case where the pixel diffusion is effected so as to completely make the mesh noticeable and its image is displayed on the imaging face, it has been found that it is difficult to perform the focusing. Namely, it is difficult for the observer to positively recognize the focused condition from the observed image.

In view of the above-described defects, an object of this invention is to provide an image display apparatus in which the focusing may readily be made while displaying the image in which the mesh is noticeable.

SUMMARY OF THE INVENTION

The inventor sought the causes for the difficulty in focusing. Then, it has been found that, with reference to the pixel mask interval portions through the light between the neighboring pixels (color light corresponding to the subject pixel in case of color), the observer makes a decision as to whether the focusing is effected or not. Accordingly, when the pixel diffusion is effected so as to completely cancel the mesh, there is no basis for the focusing. Even if the focusing is effected, it would be difficult to recognize the focusing condition.

According to the present invention, the mesh is not completely canceled by the pixel diffusion but the pixel mask interval that the observer may recognize as the gap is generated between the neighboring pixels after the pixel diffusion by moderating the pixel shift. A limit view angle that may be recognized as a gap by the observer is well known as in a so-called sight examination. For example, the recognizable limit view angle of the observer having a sight of 1.0 is defined as one minute. Therefore, the sight of the observer is predetermined, and the pixel mask interval corresponding to the recognizable limit view angle of the observer having the predetermined sight is generated between the neighboring pixels after the pixel diffusion.

Figure 1:
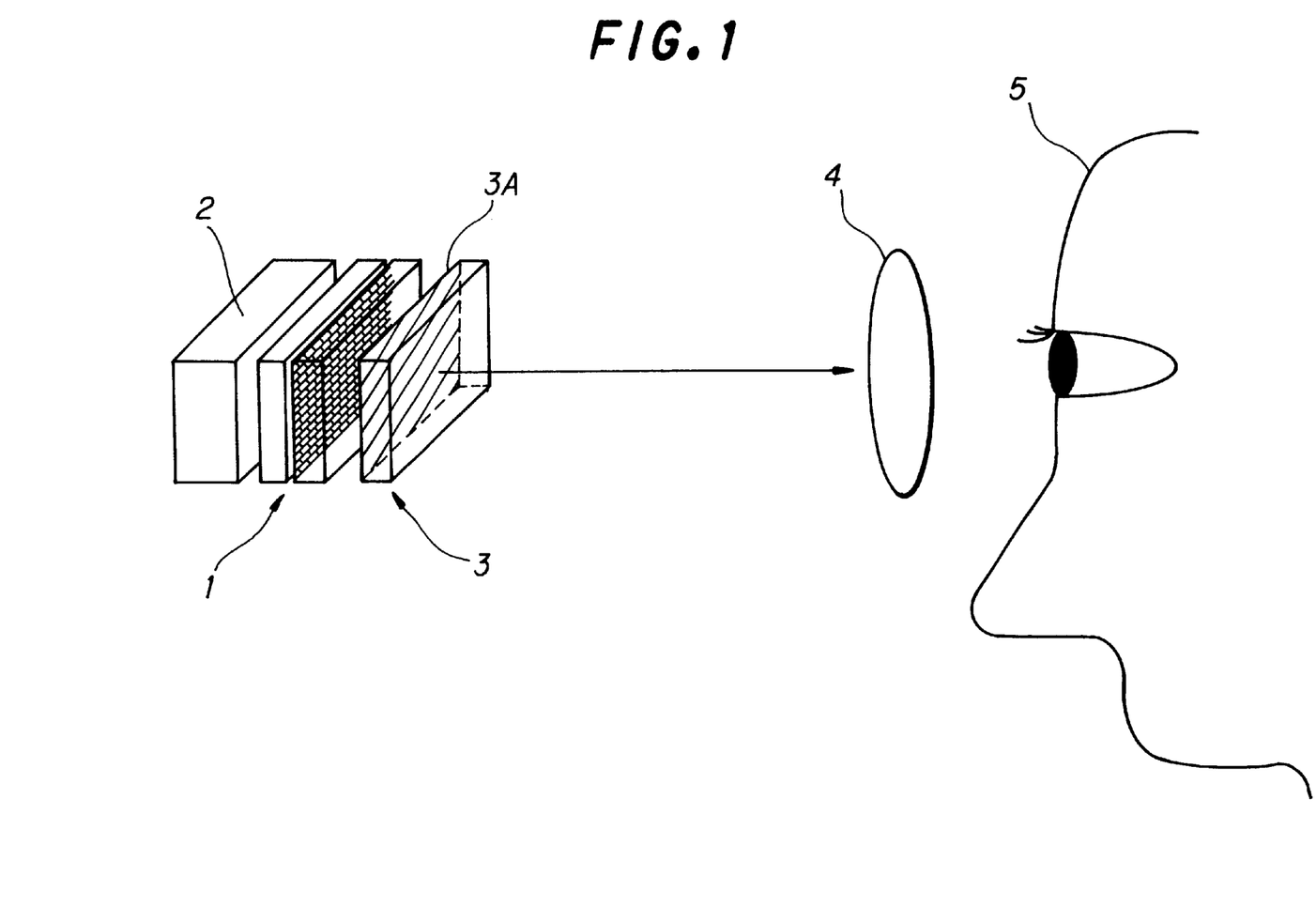
FIG. 1 is a view showing one embodiment of an image display apparatus according to this invention.

In the image display apparatus according to this invention, the above-noted point is considered. With reference to the embodiment shown in FIG. 1 to be described later, an image display apparatus comprises:

a display device 1 having an image pattern in a mosaic patter; and an optical filter surface 3A disposed on a front face of said display device for diffusing each pixel of said display device into a plurality of parts by utilizing diffraction or refraction, characterized in that said optical filter surface 3A performs the pixel diffusion so that a sight angle, of a gap which does not pass light between the neighboring pixel after the pixel diffusion, as viewed from the observer on the focal plane on which the image displayed by said display device is observed by an observer is substantially a predetermined recognizable limit view angle of the observer.

In this invention with the above-described structure, in the case where the mesh reduction is performed by the pixel diffusion, since the gap corresponding to the predetermined observer's limit view angle is generated between the neighboring pixels after the pixel diffusion, it is possible for the observer to readily perform the focusing operation by using this gap.

As described above, according to this invention, since the pixel diffusion is effected so that the pixel mask interval corresponding to the predetermined recognizable limit view angle of the observer is generated between the neighboring pixels after the pixel diffusion, it is possible to effectively make the mesh of the outlines between the pixels noticeable, and it is possible for the observer to easily perform the focusing operation of the display image.

DESCRIPTION OF THE PREFERRED EMBODIMENTS

One embodiment of an image display apparatus according to this invention will now be explained with reference to the drawings. FIG. 1 shows an overall structure of the embodiment of the image display apparatus according to this invention.

Figure 2:
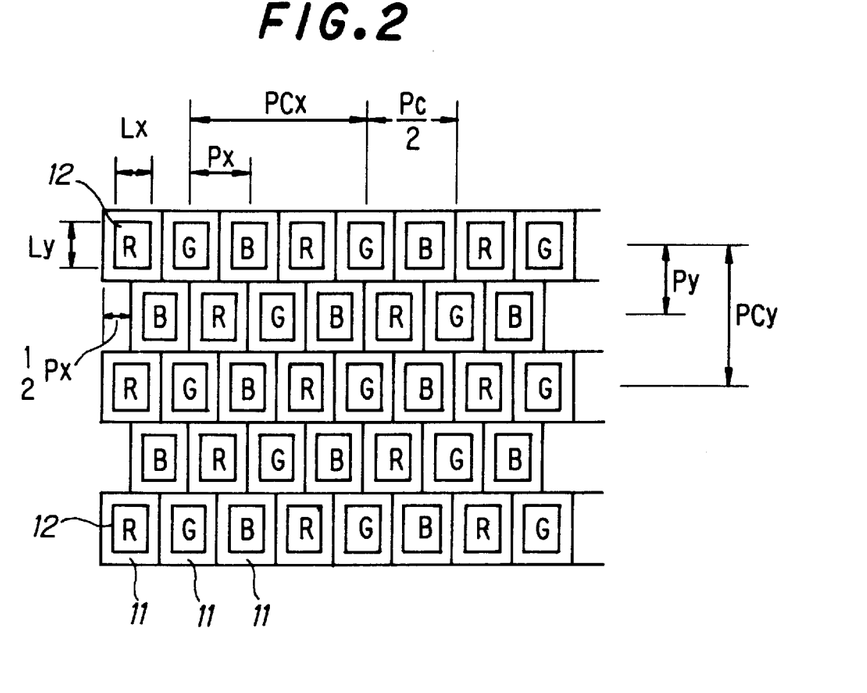
FIG. 2 is a view showing an example of a color pixel array in the case where this invention is applied to a color image display apparatus.

An LCD 1 used in this example is structured by arranging a plurality of pixels 11 in a longitudinal (column) direction and a lateral (row) direction as shown in FIG. 2. Numeral 12 denotes an aperture of each pixel 11. The aperture 12 is substantially bright. A width of the aperture 12 in the lateral direction is indicated by Lx and a width thereof in the longitudinal direction is indicated by Ly. Then, in this example, a pixel pitch in the lateral direction and a pixel pitch in the longitudinal direction are indicated by Px and Py, respectively. Also, every two rows of the pixels 11 are formed so as to be offset in the lateral direction by ½ of the lateral array pitch Px of the pixels.

Also, in this example, the color image display apparatus is shown. A color filter corresponding to the three principle colors of light is disposed relative to each pixel 11. In this example, each pixel 11 is lit in any one of color light rays of red R, green G and blue B. In this case, in each row of the pixels 11, three color combinations are arranged so as to be repeated as R, G, B, Ft, G, B, . . . A pitch of the same color pixels in the lateral direction is indicated by PCx (=3Px).

Then, in each row in every two rows, the same color pixels 11 are arranged in a row in the longitudinal direction. A longitudinal pitch of the same color pixels in every two rows is indicated by PCy (=2Py). Then, furthermore, in the neighboring rows, the positions of the same color pixels are arranged so as to be offset by ½ pitch of the array pitch PCx of the same color in the lateral direction. Namely, the same color lighting pixels are arranged in a staggered manner.

Then, in this case, a diffuser 3 in which an optical filter surface 3A is formed on one surface of a transparent plate is disposed between the surface of the LCD 1 and an ocular lens 4 as indicated by hatchings in FIG. 1.

It is possible to form the optical filter surface 3A of a diffraction lattice. In this example, it is composed of a micro prism group in which a number of micro prisms are formed. The optical filter surface 3A using the micro prism group will first be explained.

Figure 4:
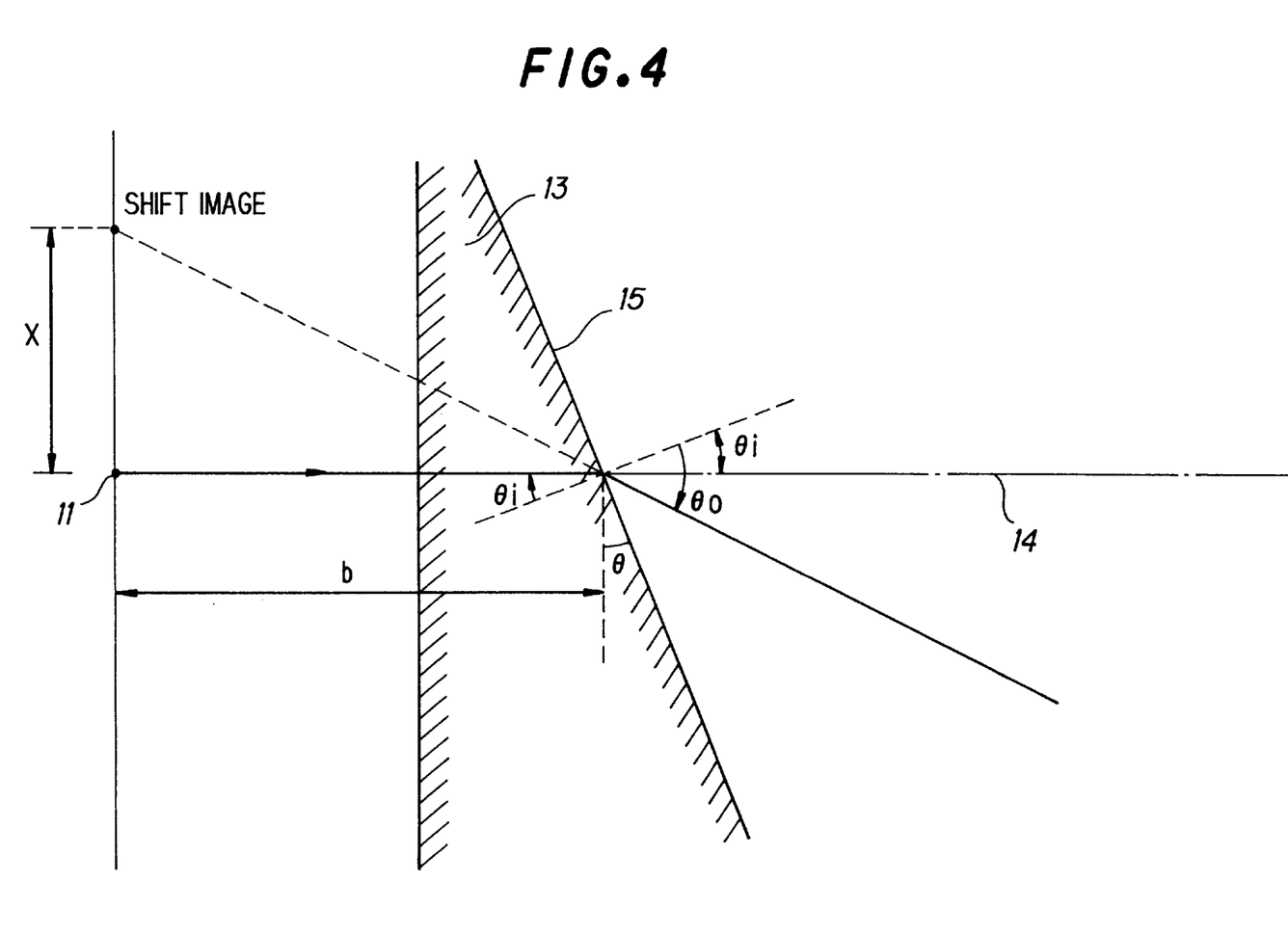
FIG. 4 is a view showing a state that an image of pixel is shifted by prism.

FIG. 4 is a view illustrating a pixel shift by the prism. In FIG. 4, numeral 13 denotes the prism which is provided with a surface 15 (hereinafter referred to as an angle surface) slanted by an angle θ (hereinafter referred to as a prism angle) relative to a direction perpendicular to an direction of an optical axis 14.

The light emitted from the pixel 11 is introduced into the angle surface 15 of the prism 13 at an incident angle θi (=θ) to be refracted thereat and is emitted at an emergent angle θo. For this reason, the observer sees as if the light is emitted from a position shifted by a shift amount x from a position of the pixel 11 and the virtual image is obtained at the shifted position.

In this case, if the refractive index of the prism is n, the following equation is given:

$$n \cdot \sin\theta i = \sin\theta o \quad (1)$$

Also, if the distance between the pixel 11 and the angle surface 15 is represented by b, the shift amount x is given as follows:

$$x = b \cdot \tan(\theta o - \theta i) \quad (2)$$

since θi=θ, $$x = b \cdot \tan\{\sin^{-1}(n \cdot \sin\theta) - \theta\} \quad (3)$$

The shift amount x is determined irrespective of the formation pitch of the prism. Accordingly, by adjusting the pitch of the plurality of micro prisms, a moire caused by the mesh may readily be suppressed.

Figure 3:
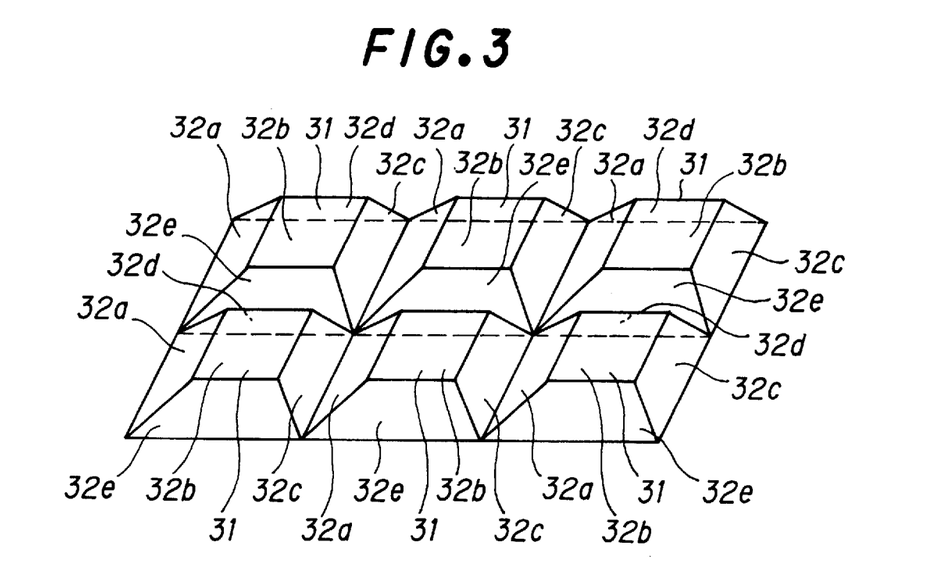
FIG. 3 is an enlarged view showing a part of an optical filter surface used in this invention.

FIG. 3 is an enlarged view showing a part of a number of micro prisms formed on one surface. In this example, each micro prism 31 is formed to have three kinds of angle surfaces 32a, 32b and 32c in the lateral direction of the display surface of the LCD 1 and three kinds of angle surfaces 32d, 32b and 32e in the longitudinal direction thereof. Thus, the three kinds angle surfaces are formed in the lateral and longitudinal directions with their top portion of a pyramid shape being flat.

In this case, the light from the single pixel of the LCD 1 is diffused in each three directions of the lateral direction and the longitudinal direction from the angle surfaces of the three kinds of prisms in the longitudinal direction and the lateral direction by the micro prisms 31, respectively. Accordingly, the number of diffusion of the image of the pixel obtained relative to the single pixel is 3×3=9.

Figure 5:
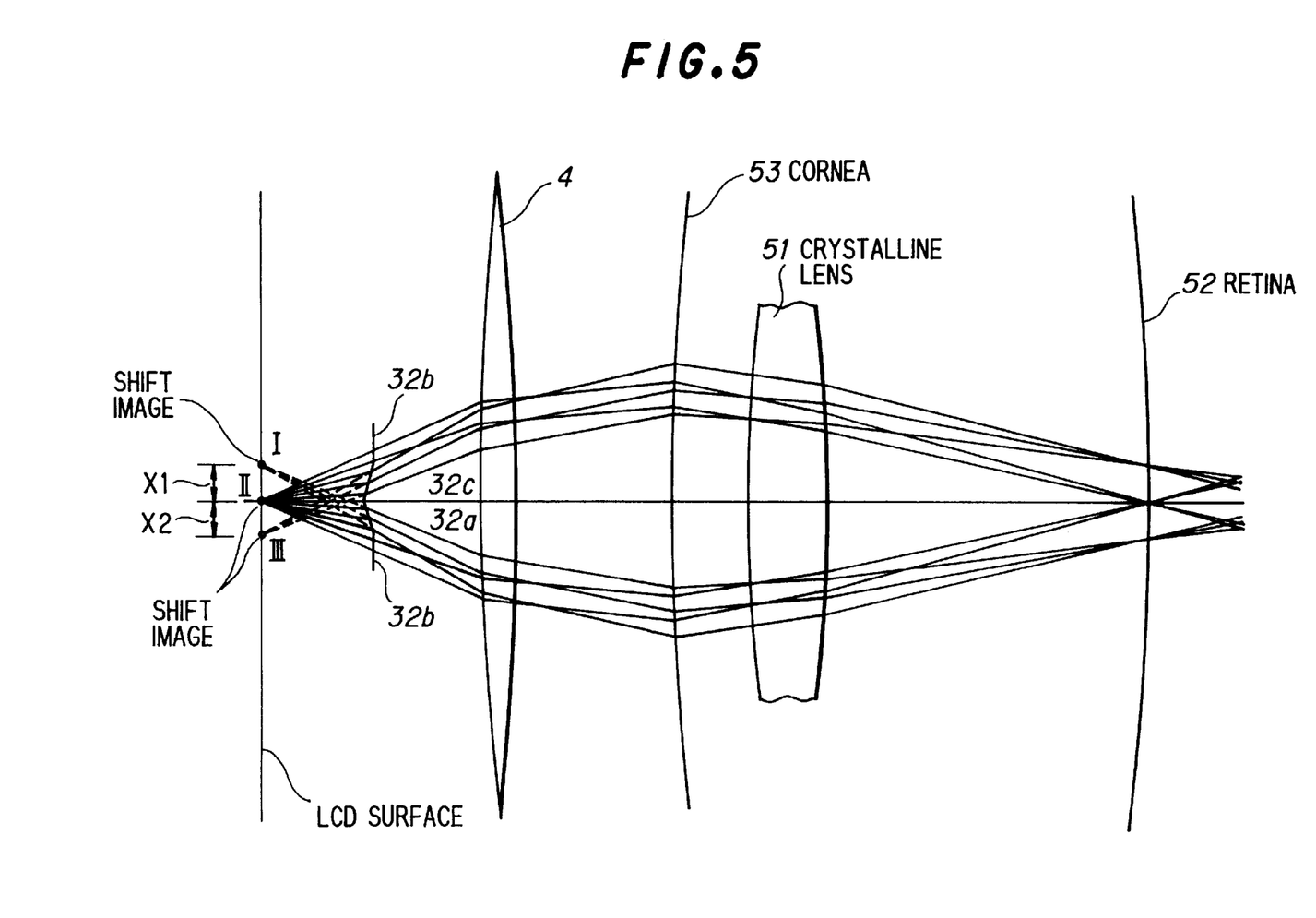
FIG. 5 view illustrating a state where an image of pixel is shifted an optical filter surface formed of a micro prism group used in this invention.
Figure 6:
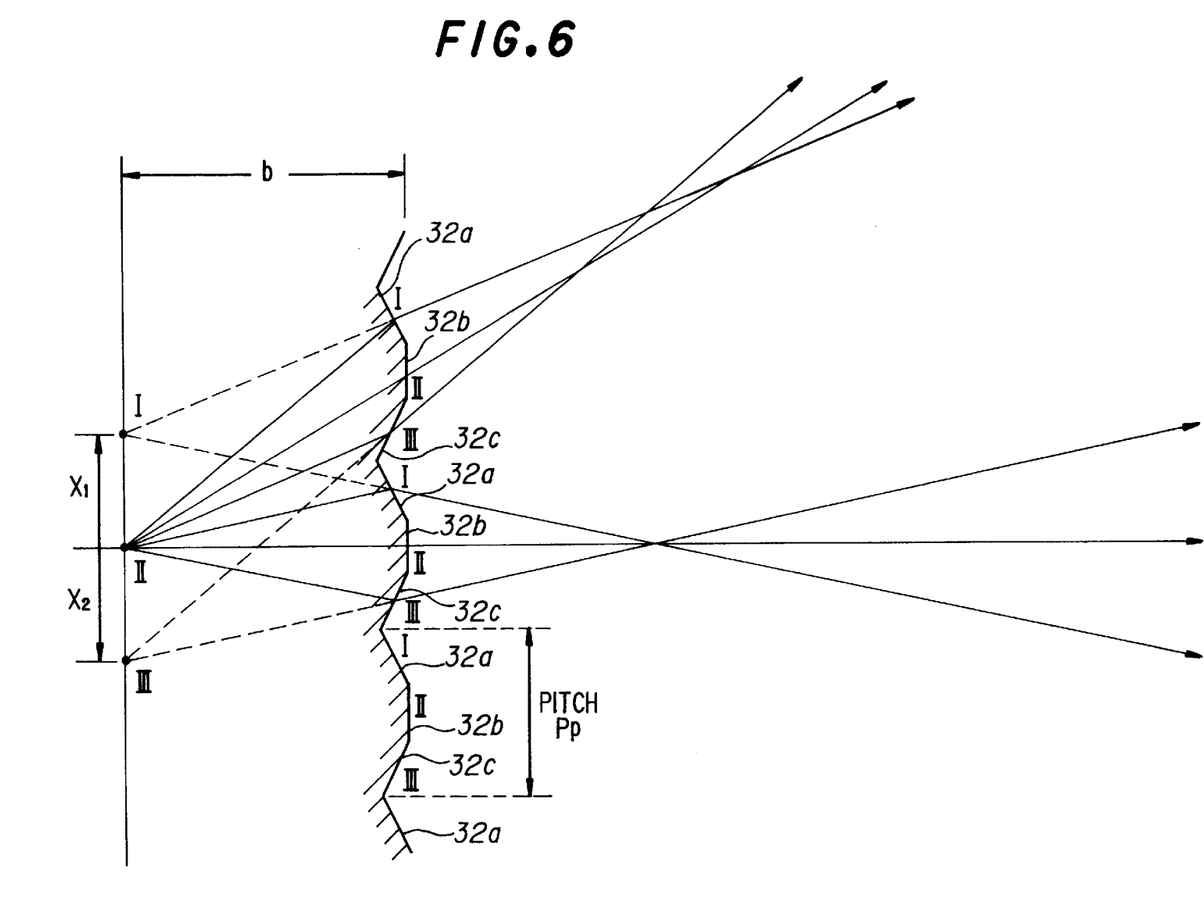
FIG. 6 is an enlarged view of a part of FIG. 5.

FIG. 5 shows a state where the number of the shift images corresponding the number of the prism angles different in images of the single pixel are formed. FIG. 6 is an enlarged view of the micro prism portion shown in FIG. 5. In this example, for instance, three-image composition (three-pixel diffusion) is realized by using the angle surfaces 32a, 32b and 32c of the different three prism angles in the lateral direction. Also, it is shown that the angle surfaces of the same prism angle of the micro prism group are focused at the same position on the retina.

The shift image is formed on a line (dotted line) obtained by extending the emission ray from the angle surface of the micro prism on the pixel side (see I, II and III of FIGS. 5 and 6). In case of the example shown, three kinds of the shift amounts of 0, x1 and x2. Accordingly, the single shift image may be brought relative to the single angle surface. Then, the sight angle (stereo angle) from the pixel from each angle surface is adjusted and the area of its angle surface is controlled so that the light intensity (luminance brightness) of the shift image (diffused image) corresponding to each angle surface may be controlled.

In the case of the optical filter surface using the prism, since the shift images may be obtained by the number of the angle surfaces of the different prism angles and the intensity of the diffused light by each angle surface is determined by the stereo angle of its angle surface, it is possible to make uniform the intensity of the plurality of diffusion light rays by controlling the stereo angle. Then, by using the plurality of optical filter surfaces, the structure of the micro prisms may be simplified.

Also, as described later, a plurality of the optical filter surfaces using the diffraction lattice and the optical filter surfaces using the micro prism group are overlapped to thereby obtain the desired number of diffusions and diffusion directions.

Figure 7:
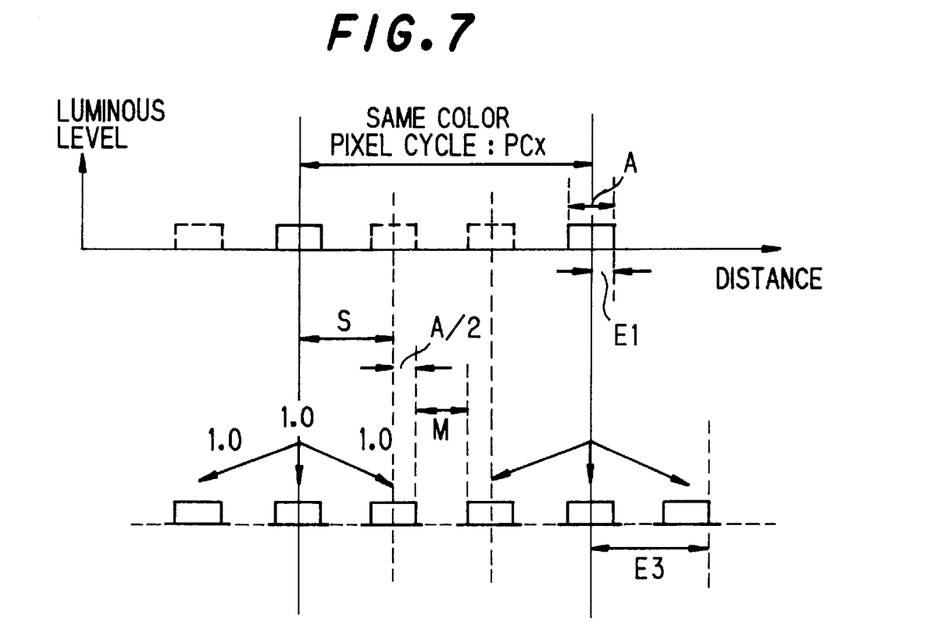
FIG. 7 is a view illustrating an example of a conventional pixel diffusion.

The pixel diffusion in accordance with this embodiment will now be described in comparison with the conventional example. FIG. 7 shows a conventional example in which the three-pixel diffusion is effected in the X axis direction (lateral direction) in the pixel array pattern shown in FIG. 2. This corresponds to the case of FIGS. 13A and 13C.

In this example, if the pixel aperture width in the shirt direction is represented by A as described above, the shift amount S and the pixel mask interval M in this case are given:

$$S=PCx/3$$

$$M=S-A$$

When the diffusion number is n, the equation is given as follows:

$$PCx-S(n-1)=A+M \quad (4)$$

Then, conventionally, the diffusion number n and the shift amount S are determined so that M=0 is established.

Figure 8:
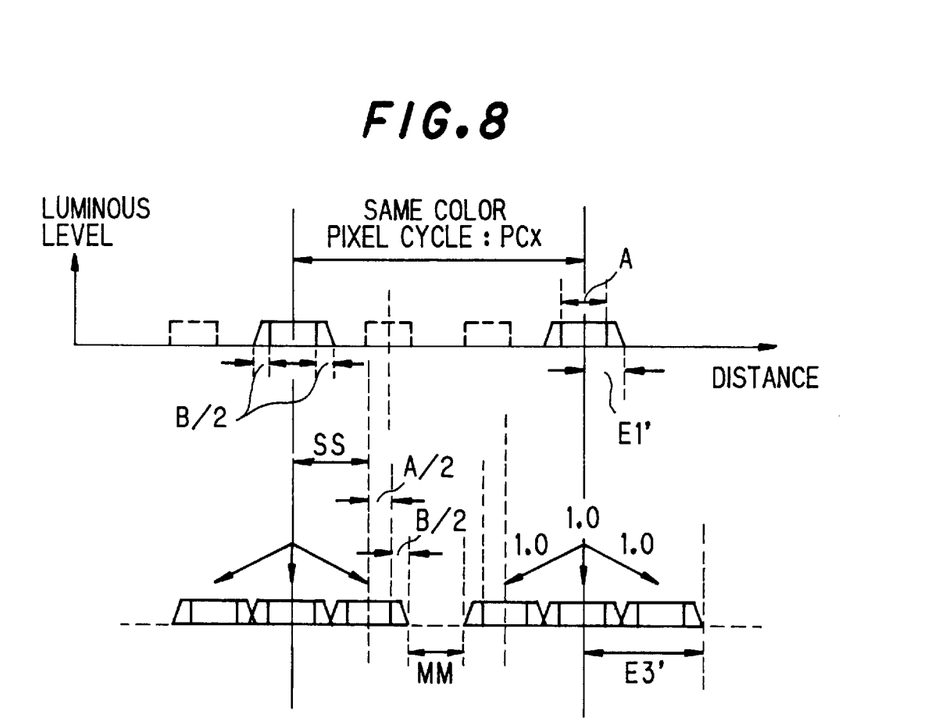
FIG. 8 is a view illustrating an example of an image diffusion according to this invention.

In contrast, in this embodiment, the diffusion number n and the shift amount SS are determined so that the pixel mask interval is about the interval MM corresponding to the recognizable limit view field (predetermined recognizable limit view field) of the observer whose sight is predetermined. For example, in this example, the observer whose sight is 1.0 is determined in advance. FIG. 8 is a view showing an example in the case where the three-pixel diffusion in the X axis direction (lateral direction) is effected under the same conditions as those of the conventional example shown in FIG. 7.

In this embodiment, in view of the fact that the pixel vignetting is generated due to aberrations of the lens and this would be sensitive for the observer, the pixel vignetting is considered. In this case, it is assumed that the pixel vignetting is generated by B/2 on both sides of the shift direction, and the pixel vignetting of B in total is generated with respect to the single pixel. Accordingly, as shown in FIG. 8, the edge spread amounts are amounts E1' and E2' which are greater by half the vignetting B than the edge spread amounts E1 and E3 of the conventional case shown in FIG. 7.

Then, as is apparent from FIG. 8, the pixel shift amount SS in case of this example is given as follows:

$$SS=(PCx-A-B-MM)/2 \quad (5)$$

$$=S-(MM+B-M)/2 \quad (6)$$

This means that the shift amount is somewhat suppressed more than the conventional shift amount S corresponding to the width MM due to the recognizable limit view angle and the contribution of the spread width B to the pixel.

The equation (2) is given by the general equation using the diffusion number n:

$$PCx-SS(n-1)=A+B+MM \quad (7)$$

Therefore, from equations (1) and (4), $$SS=S-(MM+B=M)/(n-1) \quad (8)$$

Namely, in this example, also in view of the pixel vignetting B, the pixel diffusion number n and the pixel diffusion shift amount SS by the optical filter surface 3A are set so that the pixel mask interval is the width MM corresponding to the recognizable limit view angle.

Thus, in the apparatus as the example shown in FIG. 1, for example, the observer observes the enlarged image (virtual image), of the display image on the LCD 1, focused behind the LCD 1 by the lens 4. Since on the focused image face of the enlarged image, the optical filter surface 3A of the diffuser 3 is designed to meet the foregoing conditions (5) to (8), the pixel mask interval is generated on the focusing surface by the width MMa (MM×magnification) corresponding to the recognizable limit view angle and the focusing operation may readily be attained.

In a form of the image display apparatus, the apparatus may be not only of the type in which the image enlarged by the lens as in the example shown in FIG. 1 is focused as a virtual image behind the LCD 1, but also of the type in which LCD 1 may be directly observed. In this case; the focal surface and the display surface of the LCD 1 are identical with each other.

Figure 9:
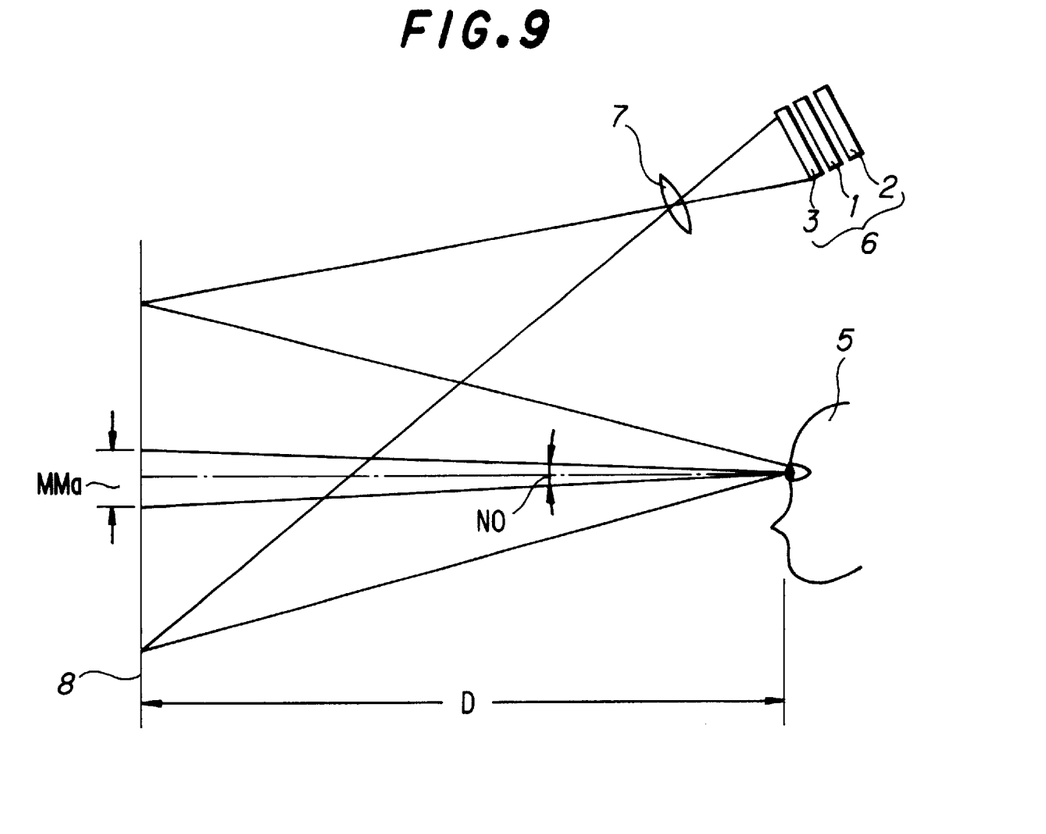
FIG. 9 is a view showing another structural example of an image display apparatus according to this invention.

Furthermore, as shown in FIG. 9, this invention may be applied to a projection type image display apparatus. Namely, an LCD 1, a back light member 2 and an optical filter 3 constitute a projection original image display section 6, the display image of the LCD 1 is enlarged and projected on a screen 8 by a lens 7, and the observer 5 at a position away from the screen 8 by a distance D (meters) may observe the projected image on the screen. As shown, in this case, the micro prisms of the filter surface 3A of the optical filter 3 are formed so that the pixel mask interval is MMa on the screen 8.

From FIG. 9, if the recognizable limit view angle is represented by NO, the value MMa corresponding to the above-described recognizable limit view angle on the focal plane is given as follows:

$$MMa=NO \times D \quad (9)$$

If the image magnification is K, the pixel mask interval MM on the optical filter surface 3A is given as follows:

$$MM=NO \times D/K \quad (10)$$

As methods for more reducing the shift amount SS than the shift amount S upon the completely mesh canceling operation and making the pixel mask interval the width MM corresponding to the recognizable limit view angle of the observer, with reference to FIG. 4, there are the following methods:

a method for changing the prism angle θ of the angle surface 15 without changing a distance b between the pixel 11 and the angle surface 15 of the micro prism;

a method reducing the pixel diffusion number n more than the conventional number; and a method for changing (shortening) the distance b between the pixel 11 and the angle surface 15 of the micro prism.

A simulation of a wire frame image will be explained with respect to a two-dimensional pixel diffusion example.

FIGS. 10A and 10B show a conventional case where the pixel diffusion shift is effected so that the mesh is completely canceled. FIGS. 11A and 11B show a case where the pixel diffusion shift is carried out in accordance with one embodiment of this invention.

FIGS. 10A and 11A show two-dimensional pattern (only the sane color pixels in case of the color display device)

which is an original pixel pattern of a display device of a mosaic pixel array. In FIGS. 10A and 1A, there is shown a case where red pixel R, green pixel G and blue pixel 8 are arranged in Δ in the lateral direction, and only the same color pixels are lit. Also, it is understood from this that the non-lighting portion is in the form of a letter V and how the oblique edge is.

The width Lx in the X axis direction and the width Ly in the Y axis direction of the aperture portion of each pixel are:
Lx=17.5 μm and Ly=60.0 μm.
The width Gx in the X axis direction and the width Gy in the Y axis direction of the pixel are:
Gx=35.0 μm and Gy=85.0 μm. the pixel (same color pixel) cycle PCx in the X axis direction and the pixel (same color pixel) cycle PCy in the Y axis direction are:
PCx=105 μm and PCy=170 μm.
The oblique direction of the pixel array is a direction of θc=58.3° relative to the X axis direction.

FIG. 10B shows a case where the pixel diffusion is effected to each pixel of the pixel pattern shown in FIG. 10A so that the portion of mesh is completely canceled. In this example, the three-pixel diffusion is effected to each pixel in an oblique direction of θ1=45° relative to the X axis direction (lateral direction), and in addition, the three-pixel diffusion is effected in an oblique direction perpendicular to the former oblique direction so that the nine-pixel diffusion is effected in total. In case of the example of FIG. 10B, the oblique shift amount, i.e., the conventional shift amount is 24.8 μm.

FIG. 11B shows a case where the nine-pixel diffusion is effected in the same direction, and the pixel mask interval is generated by the width MM corresponding to the recognizable limit view angle between the neighboring pixels after the diffusion. For example, in the case where the observation distance D is 1.8 μm and the sight is determined as 1.0 in advance, since the recognizable limit view angle is one minute, the pixel shift amount SS is 15.0 μm from the equation (5) assuming that the pixel vignetting width B=9.54 m and M=0.

From FIG. 11B, in this embodiment, the pixel mask interval (black portion) is generated between the neighboring pixels 7 the display image after the pixel diffusion, and it is understood that the focusing may readily be attained with reference to this.

Figure 10:
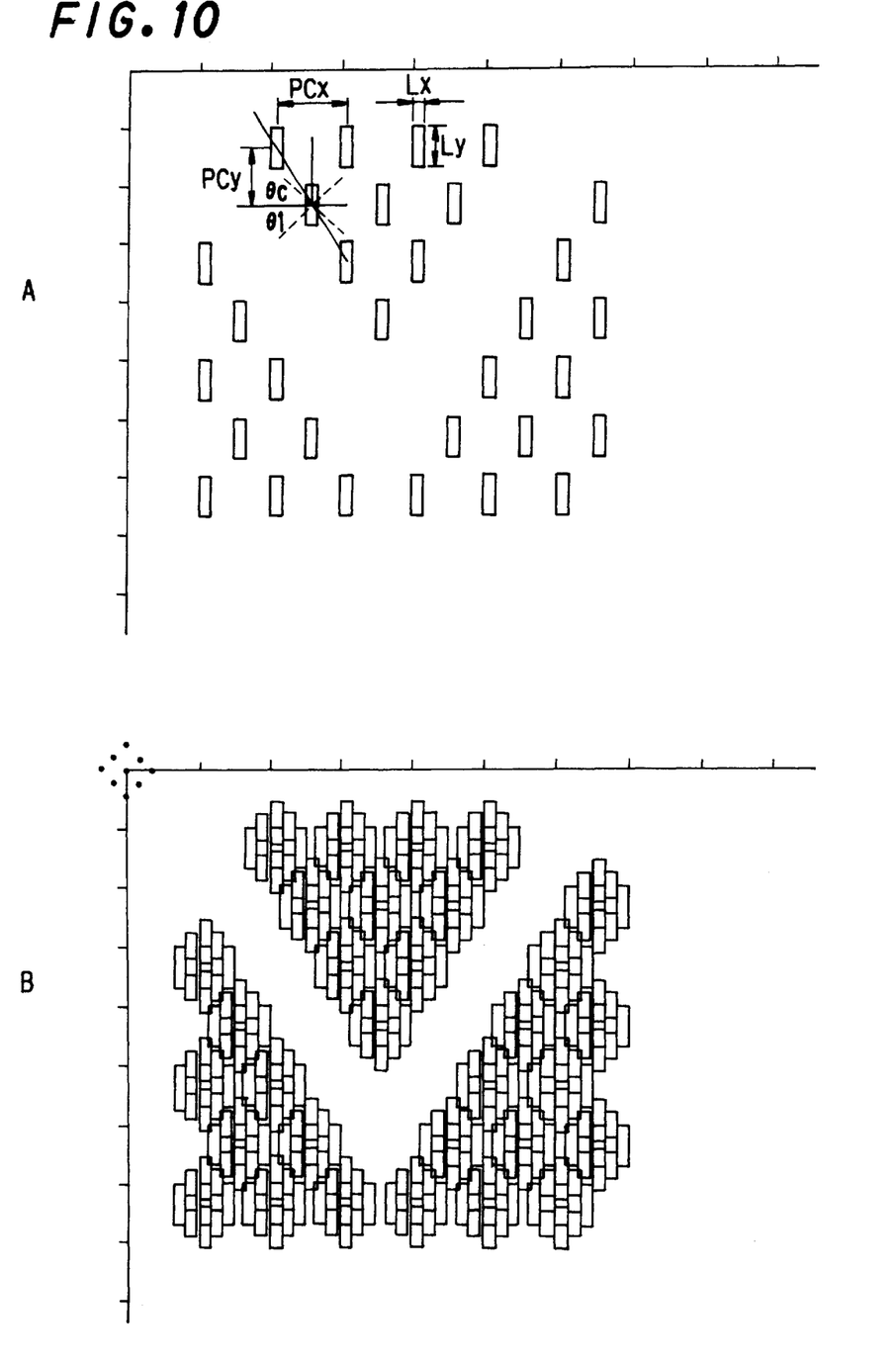
FIGS. 10A and 10B fire views showing a conventional example of a two-dimension pixel diffusion pattern in a mosaic array.
Figure 11:
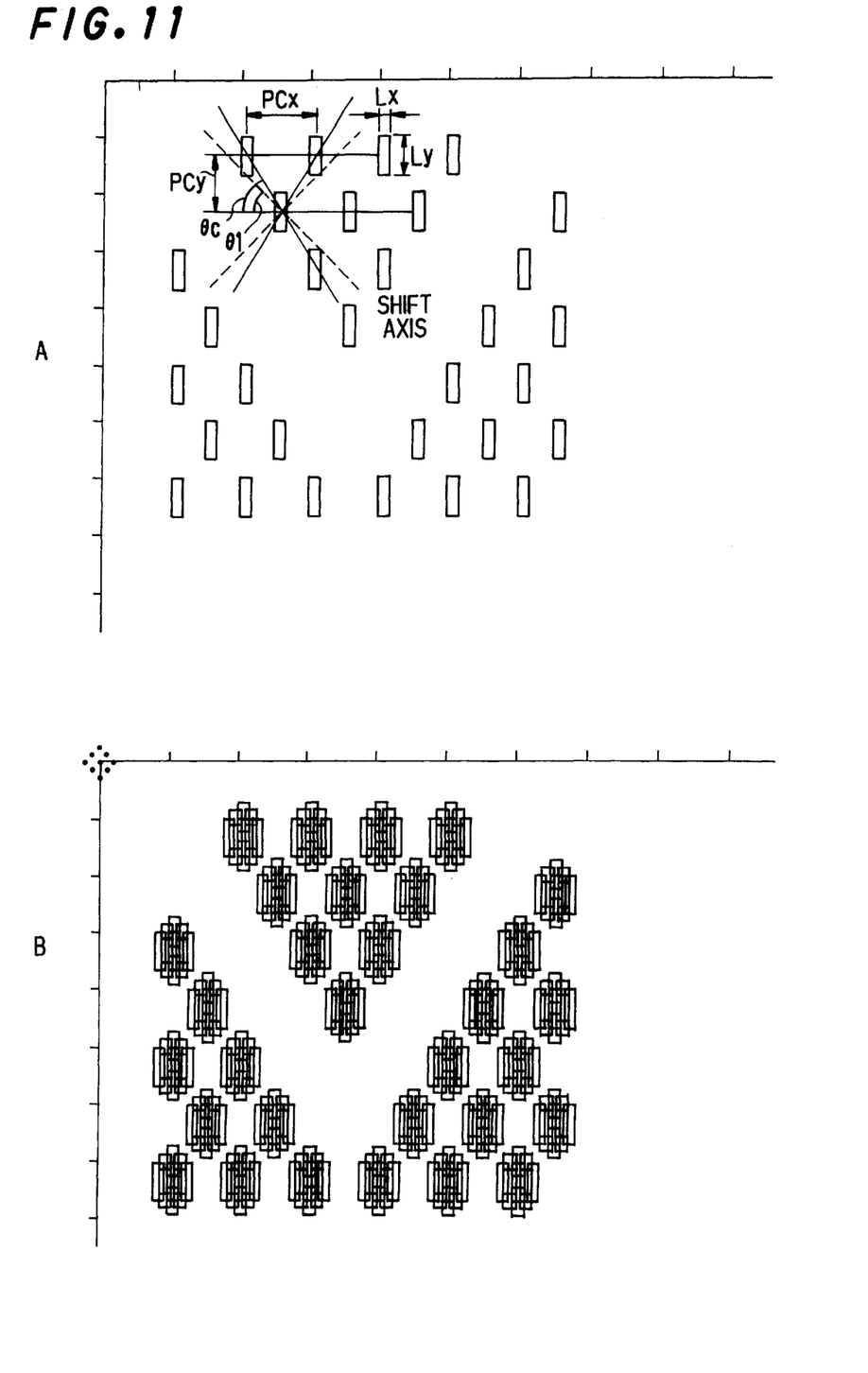
FIGS. 11A and 11B are views showing an example of a two-dimensional/pixel diffusion pattern in a mosaic array in accordance with an embodiment of this invention.

Incidentally, FIGS. 10 and 11 are different in the oblique direction of the pixel array and the shift direction. Of course, the same oblique direction and shift amount may be used. Also, the pixel shift directions is not limited to the mutual perpendicular directions.

Also, although a single optical filter surface is used in the example shown in FIG. 1, it is easy to increase the number of the pixels by providing a plurality of optical filter surfaces on the overall surface of the LCD 1.

Figure 12:
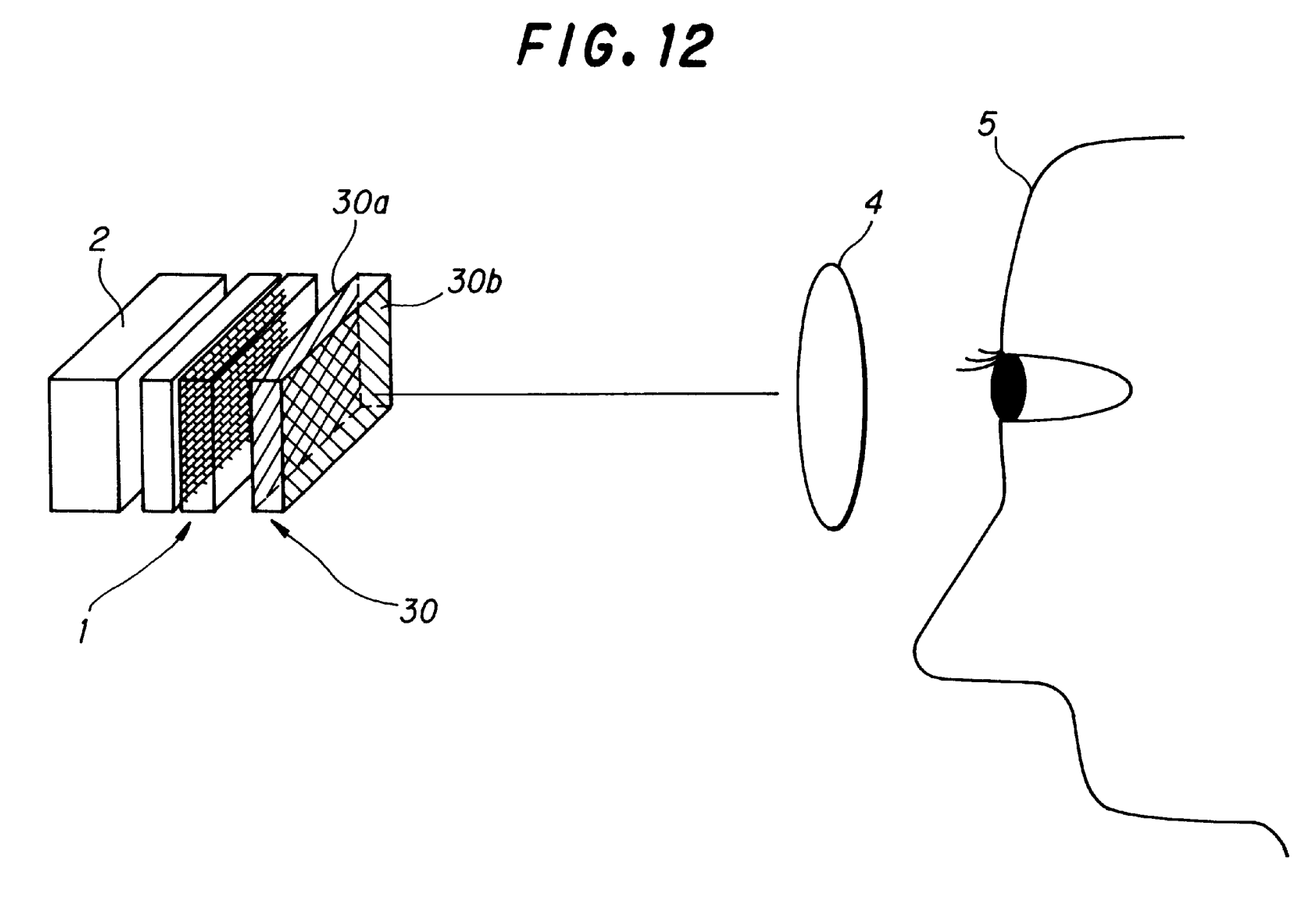
FIG. 12 is a view showing another structural example of an image display apparatus according to this invention.
Figure 13:
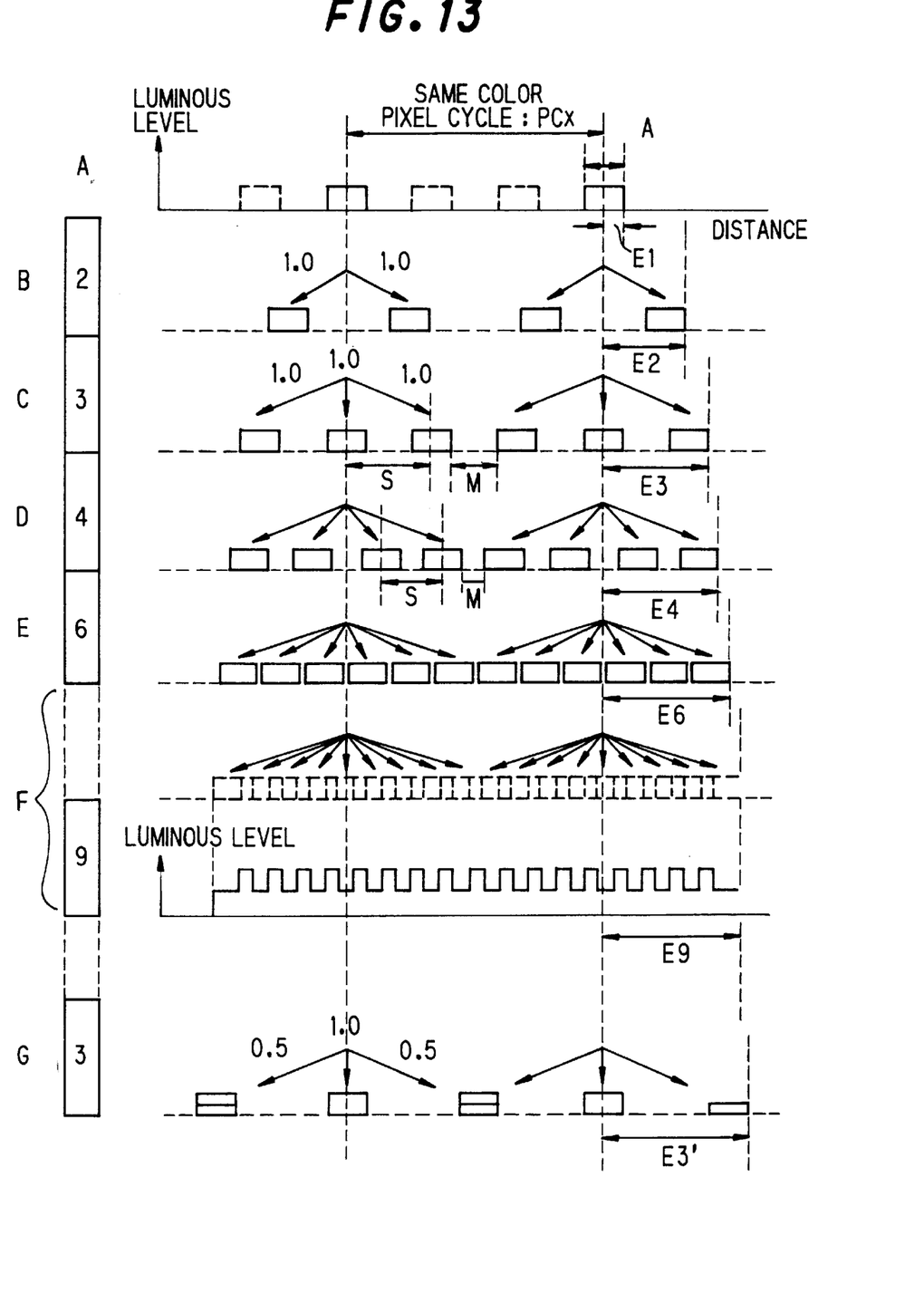
FIGS. 13A to 13G are views illustrating a relationship among an image diffusion number, a resolution and a mesh reduction.

FIG. 12 shows an embodiment in this case. In this example, two optical filter surfaces 30a and 30b are arranged between the display surface of the LCD 1 and the ocular lens 4 so that they are overlapped with each other. Namely, as indicated by hatching, the optical filter surfaces 30a and 30b are formed in two surfaces in parallel with each other and confronting the transparent plate to form a diffuser 30.

Each of the optical surfaces 30a and 30b may be formed of the above-described micro prism group or may be formed of a diffraction lattice. Also, one of the optical filter surface may be formed of the diffraction lattice and the other optical filter surface may be formed of the micro prism in combination.

The following applications herein incorporated by reference are filed by the present assignee as the disclosure relevant to the present invention:

Japanese Patent Application Nos. Hei 04-306003 (filed on Oct. 19, 1993), Hei 05-016955 (filed on Jan. 7, 1993) and Hei 05-196973 (filed on Jul. 14, 1993) each of which US applications are now pending for examination on merit.

What I claim is:

1. An image display apparatus for displaying an image to a predetermined observation point remote from said apparatus having a predetermined recognizable limit view angle, composing:

a display device having a plurality of pixels arranged in a mosaic pattern; and an optical filter surface disposed on a front face of said display device, so that said filter surface is disposed between said display device and said predetermined observation point, for diffusing each pixel of said display device into a plurality of parts by utilizing diffraction or refraction, wherein a pixel mask gap interval is generated, corresponding in width to said predetermined recognizable limit view angle, between neighboring pixels after said diffusing of each of said pixels by said optical filter surface resulting in a focused display image viewable at said observation point.

2. The image display apparatus according to claim 1, wherein said display device is a display device for a color image, and the gap is a gap which does not pass color light corresponding to the subject pixel between the neighboring pixels after the pixel diffusion with the same color pixel.

3. The image display apparatus according to claim 1, wherein a display image of said display device is focused on a screen through said optical filter surface and its projection image on the screen is observable at said observation point, and said optical filter surface performs the pixel diffusion so that a sight angle of the gap, as viewed from the observation point on the focal plane on which the image displayed by said display device is observable is substantially a recognizable limit view angle.

4. The image display apparatus according to claim 2, wherein a pixel diffusion shift amount SS on the focal plane is given as follows:

$$SS=S-(MM+B-M)/(n-1), \text{ where}$$

$$S=P/n, \text{ and } M=S-A$$

wherein S is the pixel diffusion shift amount when a sight angle of thief gap is zero, n is the pixel diffusion number, A is the pixel aperture width in the pixel shift direction, P is the pixel pitch (same color pixel pitch in case of color) in the pixel shalt direction, B is the spread width of an image vignetting, and MM=(recognizable limit view angle)×(distance between the observation point and the focal plane).

5. The image display apparatus according to claim 2, wherein a display image of said display device is focused on a screen through said optical filter surface and its projection image on the screen is observed by the observer, and said optical filter surface performs the pixel diffusion so that a sight angle, of the gap, as viewed by the observer on the focal plane on which the image displayed by said display device is observed is substantially a recognizable limit view angle observation point.

6. The image display apparatus according to claim 5, wherein a pixel diffusion shift amount SS on the focal plane is given as follows:

$$SS=S-(MM+B-M)/(n-1), \text{ where}$$

$$S=P/n, \text{ and } M=S-A$$

wherein S is the pixel diffusion shift amount when a sight angle of the gap is zero, n is the pixel diffusion number, A is the pixel aperture width in the pixel shift direction, P is the pixel pitch (same color pixel pitch in case of color) in the pixel shift direction, B is the spread width of an image vignetting, and MM=(recognizable limit view angle)× (distance between the observation point and the focal plane).

7. A filter for an image display apparatus for displaying an image at a predetermined observation point relative to said image display apparatus having a predetermined recognizable limit view angle, comprising:

a display device having a plurality of pixels arranged in a mosaic pattern; and an optical filter surface disposed on a front face of said display device, so that the filter surface is disposed between said display device and said predetermined observation point, for diffusing each pixel of said display device into a plurality of parts by utilizing diffraction or refraction, wherein a pixel mask gap interval is generated, corresponds in distance to the predetermined recognizable limit view angle, between neighboring pixels after said diffusing of each of said pixels by said optical filter surface resulting in a focused display image viewable at said observation point.

8. The filter according to claim 7, wherein said display device is a display device for a color image, and the gap is a gap which does not pass color light corresponding to the subject pixel between the neighboring pixels after the pixel diffusion with the same color pixel.

9. The filter according to claim 7, wherein a display image of said display device is focused on a screen through said optical filter surface and its projection image on the screen is observable at said observation point, and said optical filter surface performs the pixel diffusion so that a sight angle, of the gap, as viewed from the observation point on the focal plane on which the image displayed by said display device is substantially a recognizable limit view angle.

10. The filter according to claim 7, wherein a pixel diffusion shift amount SS on the focal plane is given as follows:

$$SS=S-(MM+B-M)/(n-1), \text{ where}$$

$$S=P/n, \text{ and } M=S-A$$

wherein S is the pixel diffusion shift amount when a sight angle of the gap is zero, n is the pixel diffusion number, A is the pixel aperture width in the pixel shift direction, P is the pixel pitch (same color pixel pitch in case of color) in the pixel shift direction, B is the spread width of an image vignetting, and MM=(recognizable limit view angle)× (distance between the observation point and the focal plane).

11. The filter according to claim 8, wherein a display image of said display device is focused on a screen through said optical filter surface and its projection image on the screen is observable at said observation point by an observer, and said optical filter surface performs the pixel diffusion so that a sight angle, of the gap, as viewed from the observation point on the focal plane on which the image displayed by said display device is substantially a recognizable limit view angle.

12. The filter according to claim 11, wherein a pixel diffusion shift amount SS on the focal plane is given as follows:

$$SS=S-(MM+B-M)/(n-1), \text{ where}$$

$$S=P/n, \text{ and } M=S-A$$

wherein S is the pixel diffusion shift amount when a sight angle of the gap is zero, n is the pixel diffusion number, A is the pixel aperture width in the pixel shift direction, P is the pixel pitch (same color pixel pitch in case of color) in the pixel shift direction, B is the spread width of an image vignetting, and MM=(recognizable limit view angle)× (distance between the observation point and the focal plane).

13. The image display apparatus as in claim 1, wherein said optical filter surface is formed of a micro prism group.

14. The image display apparatus as in claim 1, wherein said optical filter surface is formed of a diffraction lattice.

15. The image display apparatus as set forth in claim 7, wherein said optical filter surface is formed of a micro prism group.

16. The image display apparatus as in claim 7, wherein said optical filter surface is formed of a diffraction lattice.

17. The image display apparatus as set forth in claim 1 wherein the pixel mask go interval is defined by a width MM corresponding to the recognizable limit view angle between the neighboring pixels after diffusion.

* * * * *

UNITED STATES PATENT AND TRADEMARK OFFICE
CERTIFICATE OF CORRECTION

PATENT NO.     : 6,310,724 B1                                                Page 1 of 1
DATED          : October 30, 2001
INVENTOR(S)    : Yoshiki Shirochi It is certified that error appears in the above-identified patent and that said Letters Patent is hereby corrected as shown below:

<u>Column 10,</u>
Line 40, insert between "SS" and "on" -- to be sought --.

Signed and Sealed this

First Day of April, 2003

JAMES E. ROGAN
*Director of the United States Patent and Trademark Office*